(12) United States Patent  
Malecki et al.

(10) Patent No.: US 8,475,611 B2
(45) Date of Patent: Jul. 2, 2013

(54) METHOD AND DEVICE FOR APPLICATION OF A STRIP MATERIAL

(75) Inventors: Klaus Malecki, Diegem (BE); Detlef Richert, Diegem (BE); Andreas Hoefer, Diegem (BE); Johannes Wossner, Stuttgart (DE); Thomas Ledermann, Besigheim (DE); Martin Naumann, Stuttgart (DE)

(73) Assignees: 3M Innovative Properties Company, Saint Paul, MN (US); Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 468 days.

(21) Appl. No.: 12/442,656

(22) PCT Filed: Sep. 25, 2007

(86) PCT No.: PCT/EP2007/008323
§ 371 (c)(1),
(2), (4) Date: Aug. 19, 2009

(87) PCT Pub. No.: WO2008/037426
PCT Pub. Date: Apr. 3, 2008

(65) Prior Publication Data
US 2009/0301634 A1 Dec. 10, 2009

(30) Foreign Application Priority Data
Sep. 25, 2006 (EP) .................................. 06020054

(51) Int. Cl.
*B32B 41/00* (2006.01)
(52) U.S. Cl.
USPC ............. 156/64; 156/350; 156/351; 156/358; 156/361; 156/362; 156/363; 156/367; 156/378; 156/379

(58) Field of Classification Search
USPC ................... 156/64, 350, 351, 358, 361, 362, 156/363, 367, 378, 379
See application file for complete search history.

(56) References Cited

U.S. PATENT DOCUMENTS

| 4,666,550 | A | * | 5/1987 | Spiers et al. | 156/361 |
| 4,781,782 | A | * | 11/1988 | Luhman et al. | 156/361 |
| 5,201,106 | A | | 4/1993 | Moore et al. | |

FOREIGN PATENT DOCUMENTS

| DE | 37 10 726 | 10/1998 |
| DE | 101 38 781 | 2/2003 |
| DE | 103 42 658 | 4/2005 |
| EP | 0 894 563 A2 | 2/1999 |
| EP | 1 502 790 | 4/2006 |
| JP | 08-300489 | 11/1996 |
| JP | 11-060001 | 3/1999 |
| JP | 2000-335460 | 12/2000 |
| JP | 2004-161485 | 6/2004 |

* cited by examiner

Primary Examiner — Katarzyna Wyrozebski Lee
Assistant Examiner — Joshel Rivera
(74) Attorney, Agent, or Firm — Mueting, Raasch & Gebhardt, P.A.

(57) ABSTRACT

The present invention relates to a method and a device for the application of a strip material to a substrate. Particularly, the present invention relates to a automatic application of an elongate strip of elastic material to a substrate. The present invention further relates to a device and a method for applying a seal strip such as a weatherstrip seal to a substrate. The elongate strip is advanced by drive means and positioned on a substrate by means of an application unit. The stress of the elongate strip is controlled by a stress control unit which is positioned in the area between the drive means and the application unit.

27 Claims, 4 Drawing Sheets

METHOD AND DEVICE FOR APPLICATION OF A STRIP MATERIAL

Figure 1:
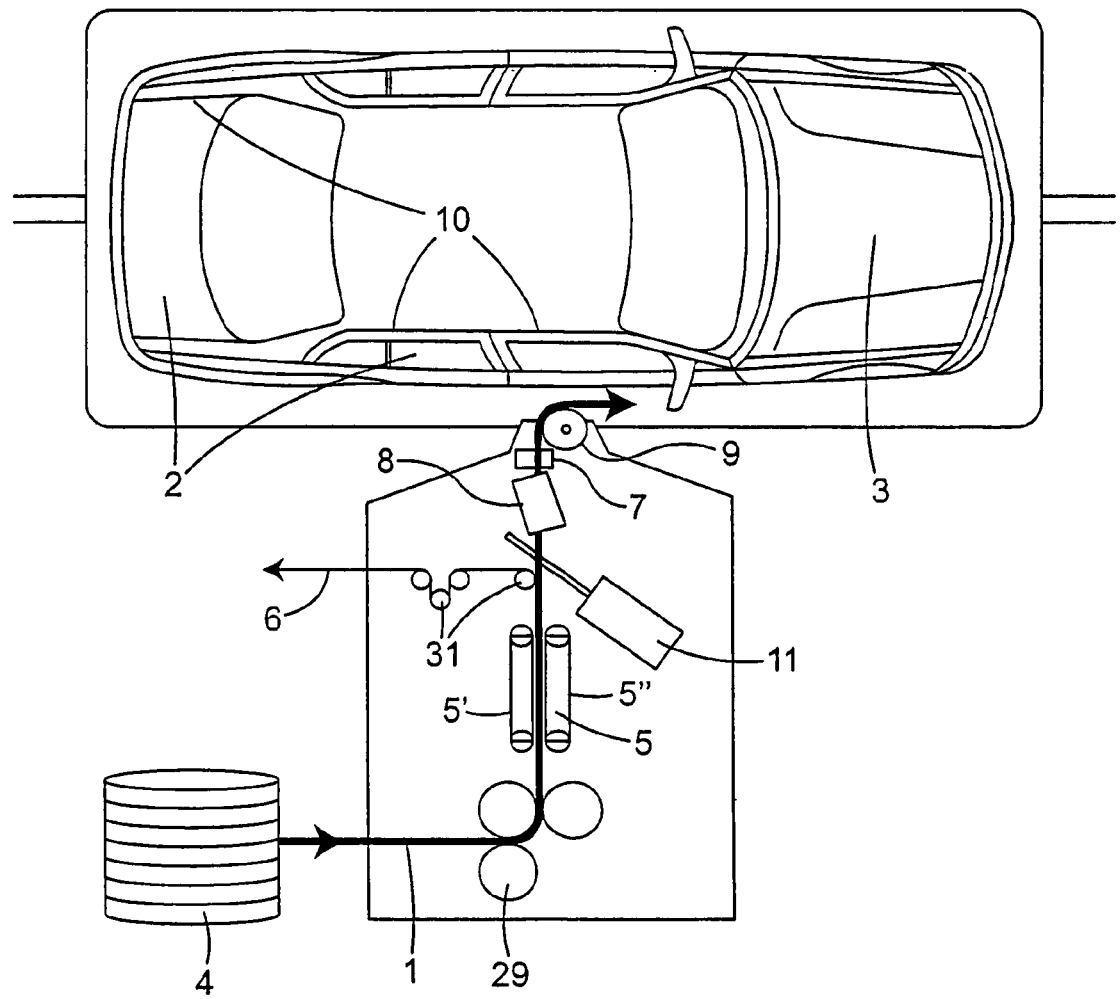

The present application is a U.S. National Stage Application of International Application No. PCT/EP2007/008323, filed 25 Sep. 2007, entitled METHOD AND DEVICE FOR APPLICATION OF A STRIP MATERIAL, which claims the benefit of EP Application No. 06020054.0, filed 25 Sep. 2006, entitled METHOD AND DEVICE FOR APPLICATION OF A STRIP MATERIAL, all of which are hereby incorporated by reference in their entirety.

The present invention relates to a method and a device for the application of a strip material to a substrate. Particularly, the present invention relates to a automatic application of an elongate strip of elastic material to a substrate. The present invention further relates to a device and a method for applying a seal strip such as a weatherstrip seal to a substrate. According to a preferred embodiment, the strip is an adhesive tape-applied strip such as an adhesive tape-applied weatherstrip seal, to be applied to a substrate or a peripheral edge of a body or structure defining an opening (e.g., a vehicle door or a door frame of a vehicle body such as an automobile, aircraft, or watercraft body).

In particular, such a device allows and such a process includes advancing a finite or continuous length of a strip, such as a tape-applied weatherstrip seal, through an applicator head or end effector of an application device.

Methods and devices for applying strips with an adhesive surface to substrates are well known in the art. For example, rubber or other elastomeric profiles are known for making waterproof and/or airtight seals, for example, for use in automobile and refrigerator doors. Such elastomeric profiles are commonly provided in a closed-loop format, or of a discrete length, or in a continuous roll, and often have at least one heat-formed or molded corner. Generally, each strip such as an elastomeric profile, or weatherstrip, is specifically designed and manufactured for each type of specific application or specific substrate to be sealed.

Commonly, the weatherstrips are attached to an opening, such as a door opening, to be sealed using mechanical interlocking techniques where the profile engages a flange or channel in the door opening or in the door itself. Alternatively, the elastomeric profiles may be attached using other mechanical means such as pins. Elastomeric profiles may also be glued into place or can be attached to a door opening by using pressure-sensitive adhesive tapes.

Tapes especially suited for adhering rubber or other elastomeric profiles used for seals in automotive door or trunk openings are available from 3M Company (3M Deutschland GmbH in Neuss, Germany). Examples include a dual functional adhesive tape with a heat-activated adhesive on one side for bonding to the elastomeric profiles and a tacky pressure-sensitive adhesive on the other side for adhering the taped elastomeric profiles to a door opening, or a tape including a pressure-sensitive adhesive on each. The particular tape that is selected depends on the substrates to which the elastomeric profile is to be bonded.

Robotic end effector tooling is known for mechanically installing a closed-loop of weatherstrip to a lip surrounding a vehicle opening. Typically, the apparatus comprises means for feeding the weatherstrip to the end effector, a plurality of guide rollers to form the length of a weatherstrip into a loop, and a plurality of arms for pressing the weatherstrip onto a lip of an opening. End effector tooling of applicator heads have also been disclosed to facilitate the installation of adhesive-based weather stripping to a vehicle opening.

DE-A-103 42 658 relates to a method for applying an adhesive tape to a substrate as well as to a respective device. The adhesive tape is advanced from a provision unit over a guidance unit to an application position which is used as a starting position for applying the adhesive tape to a substrate. During the application of the adhesive tape to the substrate, the necessary amount of adhesive tape is taken from a reserve roll preceding the guidance unit. The supply of adhesive tape is automatically refilled from the provision unit to the guidance unit during the application of the tape if the supply falls below a predetermined minimal threshold indicating a minimal supply.

EP-B-1 502 790 relates to a unit for dynamically and continuously fitting a sealing strip with an adhesive coating to a body or a bodywork element of a motor vehicle. This unit is discussed as having at least one feeder station for an extruded section with an adhesive-coated fixing part covered by a protective film, an automated applicator head for fitting the strip cut in the extruded section by cutting means, a robot which either manipulates the bodywork element around the automated head, which is stationary, or manipulates the automated head around the body or bodywork element, which is stationary. The fitting unit is characterized in that the fitting unit has means for detecting the presence of air venting holes and/or water evacuation holes in the section, and/or means for piercing at least one of these holes in the section.

DE-A-101 38 781 relates to a method for applying a continuous seal to the body of a vehicle, wherein the seal, is drawn from a roll and supplied to the vehicle door. For carrying out the discussed method, the device comprises a pressure roll which is guided over the seal as well as guidance means for guiding the seal before application, wherein the device for applying the seal to the vehicle door is pivotable around an axis, preferably around 360°.

The methods and devices known in the prior art, irrespective of whether they are static systems (the substrate is moved relative to a fixed strip or seal), dynamic systems (where the seal strip and the application device are moved relative to the substrate), or hybrid systems, are—although having been improved in the past—disadvantageous. In particular, it has been observed that strips having been applied to a substrate often exhibit wrinkles and/or the strip loosens over time from the substrate it was applied to. Depending on the desired use, such wrinkles or loosening heavily deteriorate the usability of the strips.

It would be desirable to provide a further, preferably an improved method, and a further, preferably an improved device for the application of a strip material to a substrate. Particularly, it is desired to provide a further method and further device which is reliable, simple, and effective and which may overcome the deficiencies of known methods or devices.

It has been found that the stress level of the strip before it is applied has a high influence on the quality of the applied strip. For example, if the strip before its application is affected by compressive stress, this may cause the strip surface to exhibit wrinkles thereby deteriorating its qualities. Also, this often results in a loosening of the strip from the substrate. If the strip before its application is affected by tensile stress, this may lead to a loosening of the strip from the substrate.

Accordingly, both tensile and compressive stress, particularly in the corners of an elongate strip applied to a substrate in a geometrical form, e.g., a weatherstrip provided along a door opening in a car body, can lead to loosening of the elongate strip from the substrate.

Thus, according to the present invention, the stress level of a strip to be applied to a substrate is controlled before application.

According to particular embodiments of the present invention, this can be achieved in an effective and efficient manner which is generally reliable and easy to handle. Moreover, strips applied according to the method or by the device of the present invention are generally durably and securely applied to the substrate, wherein the method and the device according to the present invention can be variably used in different fields and with different application methods, such as static, dynamic or hybrid methods. Furthermore, the present invention allows the application of fast, easy and reliable control cycles.

Accordingly, the present invention relates to a device for applying a strip, typically an elongate strip, e.g. of elastomer material, to a substrate. Generally, the elongate strip further comprises an adhesive layer bearing a removable protective cover sheet, commonly referred to as a liner, that serves to protect the surface of the, typically pressure-sensitive adhesive layer intended for final application of the strip to the substrate. The elongate strip is advanced or driven by means of drive means. These drive means may be, for example, advancement rollers pressing the elongate strip against counteracting guidance rails. In an embodiment, the drive means are at least one and preferably two belt drive means. More preferably, such belt drive means are located opposite to one another thereby contacting opposing surfaces of the elongate strip. Preferably, the drive means are driven independently. More preferably, the drive means serve not only to advance the elongate strip toward an application position but also serve to influence the stress build in the elongate strip by, e.g., stretching forces.

The device further comprises an application means for positioning the elongated strip on a substrate and/or for pressing the elongate strip to a substrate. The application means is, seen in the direction of advancement of the elongate strip, located behind the drive means, i.e., closer to the substrate. The application means is typically a pin roller, as which it is referred to hereafter for the ease of understanding. However, it should be understood that a pin roller is not restricted to a perfectly circular roll but also encompasses, e.g. star-shaped application means and the like, suitable to fulfill its function.

The pin roller may be driven or freely rotating. According to particular embodiments, the torque of the pin roller is adjustable. Moreover, the pin roller is generally driven, e.g., by a motor etc. In particular, according to an embodiment, the pin roller is capable of inducing a defined stress level into the elongate strip, such as a defined tensile stress, a defined compressive strength or no stress.

The device further comprises a stress control unit for controlling the stress of the elongate strip. The stress control unit generally comprises a sensor unit for monitoring/determining the stress level of the strip. According to an embodiment, the sensor is positioned between the drive means and the pin roller. Furthermore, the stress control unit typically comprises a control unit for controlling the drive means and/or the pin roller based on the stress level of the elongate strip as monitored/determined by the sensor unit.

According to a particular embodiment, the stress control unit further monitors at least one parameter of the pin roller and based on this detected parameter controls the drive means. Generally, the sensor unit is a displacement transducer measuring a displacement of the strip caused by the level of stress in the elongate strip.

In particular, in the area where the sensor unit is arranged, the elongate strip is free to move in certain, predefined directions depending on whether the elongate strip is under tensile or compressive stress. According to an embodiment, between the drive means and the pin roller and at least in the area of the sensor unit, the elongate strip performs a loop suitable for increasing the displacement of the elongate strip due to compressive or tensile stress, when compared to the situation without loop.

For example, between the drive means and the pin roller the elongate strip runs along a, e.g. slightly curved, path. Now if the elongate strip is under tensile stress, the radius of the curvature will increase and the elongate strip will run on a straighter path. Contrary, if the elongate strip is under compressive stress, the radius of the curvature will decrease. Accordingly, obviously the application of tensile or compressive stress to the elongate strip causes a displacement of the strip into opposite directions. Such displacement as well as the respective direction of displacement is detected by the sensor unit of the stress control unit. The drive means and/or the pin roller, respectively may then be controlled based on the detected stress situation, as will be discussed later.

According to a particular embodiment, the sensor unit comprises a forked lever which is displaceable in at least two directions by contact of the elongate strip. The displacement of the elongate strip is preferably boosted by the lever mechanism and measured by further measuring means.

According to a further embodiment, the device comprises a cutting mechanism which cuts the strip to a defined length. Generally, several sensors are provided for controlling such cutting process.

Typically, if a strip comprising an adhesive layer and a liner is used, the device further comprises a mechanism for removing and disposing the liner in a controlled way. Conveniently, the device further comprises guidance instruments for guiding the elongate strip before application.

According to a further embodiment, the device according to the present invention is build up in a modular way allowing an easy modification of the device according to individual parameters, such as the strip or substrate used, etc.

The present invention further relates to a method for applying an elongate strip of elastomer material to a substrate. According to an embodiment, the respective method generally corresponds to the use of the device as discussed above. Conveniently, the method comprises the steps of advancing an elongate strip towards the application side by drive means and, positioning the elongate strip on a substrate and/or pressing the elongate strip to a substrate by means of a pin roller, controlling stress of the elongate strip and monitoring, in the area between the drive means and the pin roller the stress level of the elongate strip and controlling the advancement of the elongate strip via the drive means based on the stress level of the elongate strip as detected by the sensor unit.

The present invention allows the application of an elongate strip to a substrate under a defined stress situation thereby preventing draw back such as wrinkling or loosening of the strips after the application to the substrate. Thereby, the present invention also ensures a gapless joint of the elongate strip when being provided in a circular or closed contour to a substrate, by cutting the elongate strip to a defined length.

Moreover, the present invention allows the provision of an elongate strip for different kind of applications, application geometries, strip forms or contours in an efficient and reliable manner in a short time frame. Further advantages may include controlled, defined and reproducible process parameters like stress, strain, pressure and length, particularly for circulating strip applications. Such improved control may lead to reproducible and reliable high quality applications, meeting demanding requirements with regard to cycle time.

Figure 2:
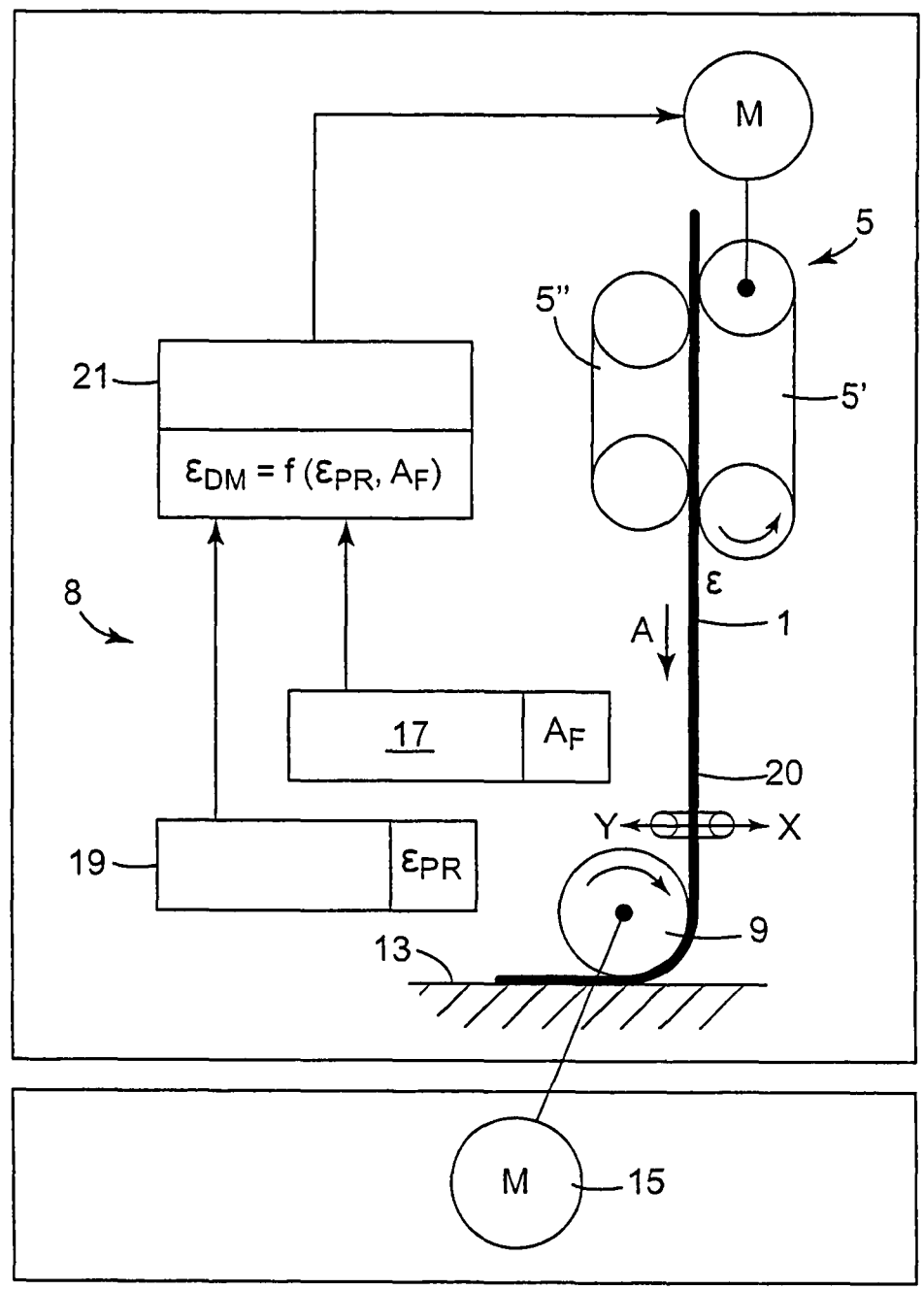
Figure 3A:
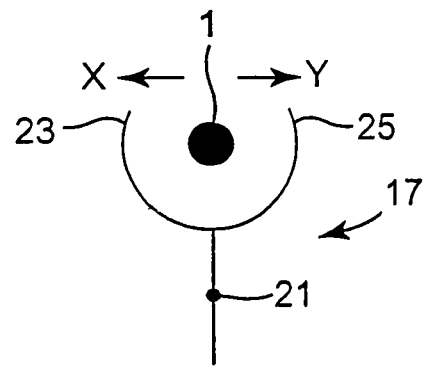
Figure 3B:
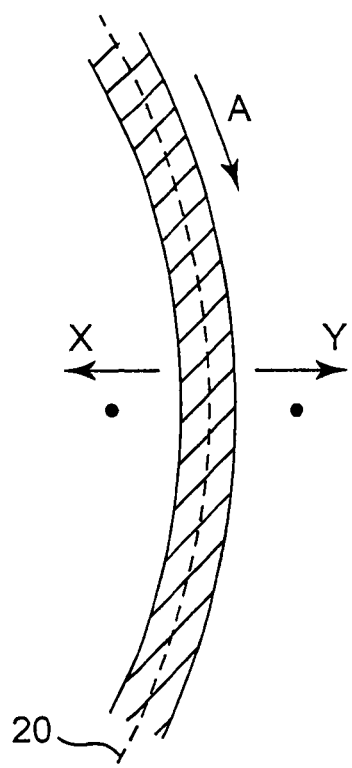
Figure 4:
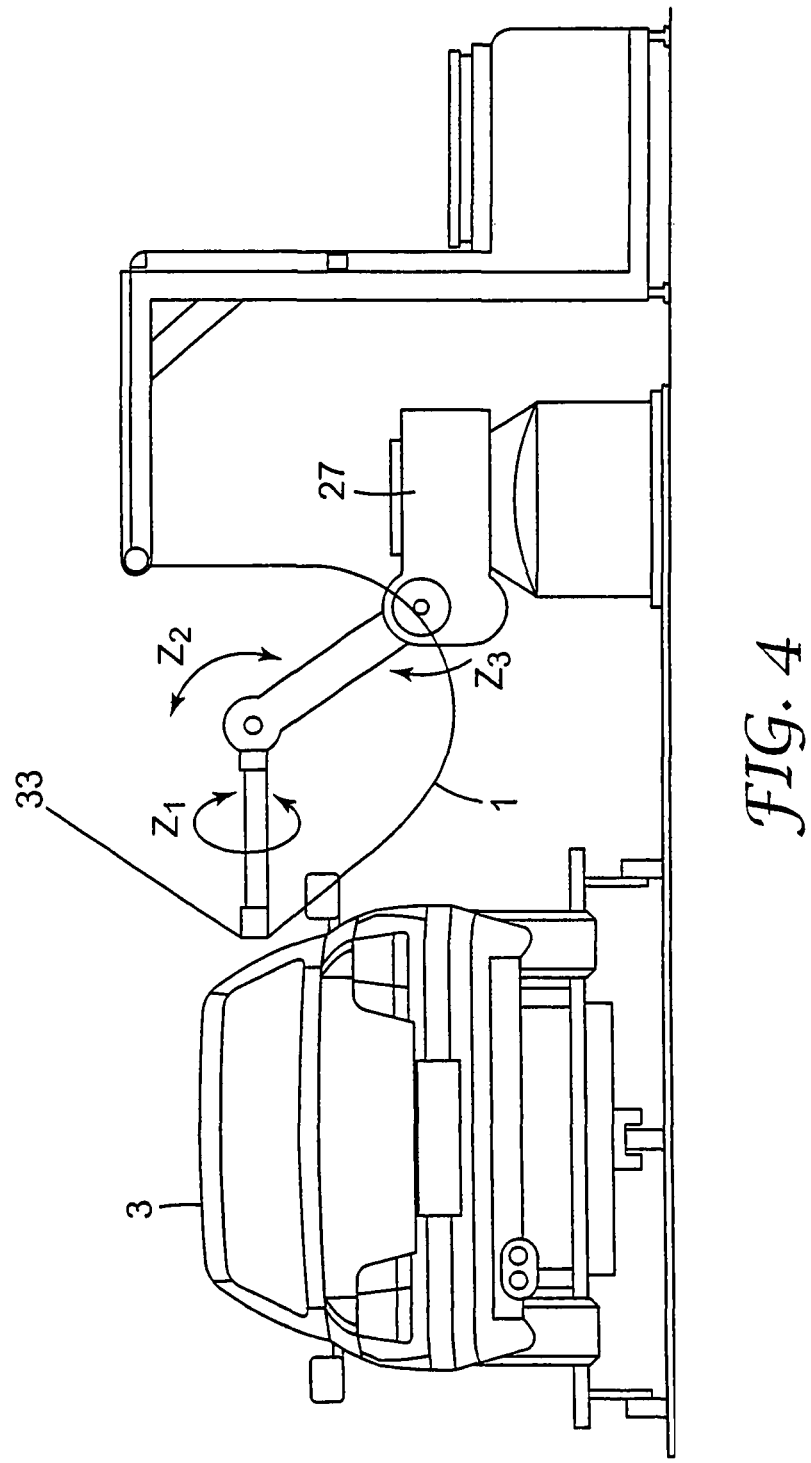

In the following, the present invention will further be discussed and illustrated by reference to preferred embodiments as shown in the Figures of which FIG. 1 shows a schematic sketch of a device for applying an elongate strip of elastomer material;

FIG. 2 shows a further schematic view on a device according to the present invention;

FIG. 3 schematically shows sensor unit of the stress control unit, wherein FIG. 3a shows a side view of the respective sensor means and FIG. 3b shows a top view on the respective sensor means; and FIG. 4 shows a schematic view of a device according to the present invention mounted to a robot for applying seal strips to a vehicle body.

These figures are merely for purpose of illustrating the invention without the intention to limit the invention thereto.

FIG. 1 shows a device for applying an elongate strip of elastomer material to a substrate according to a particular embodiment of the present invention. As already discussed in the introductory section of the present application, the device and the method according to the present invention are typically used for but not restricted to the application of seal strips, such as weatherstrips to e.g., car bodies. Therefore, the elongate strip may be provided with an adhesive covered by a liner in order to allow easy fixation of the elongate strip on the substrate. However, as will be acknowledged by the person skilled in the art, such adhesive needs not to be provided on the elongated strip but may also be provided on the substrate prior to application of the elongate strip. Also mechanical fastening means, such as e.g. clips, may be used for the application of seal strips to a substrate.

Accordingly, FIG. 1 shows a device (or procedure) for the application of elongate strips 1 provided with an adhesive layer to apertures or openings 2 of car bodies 3. As shown, an endless elongate strip or seal 1 is provided from a supply roll 4. The strip is peeled off the roll 4 and advanced by drive means 29. The device further or alternatively comprises counter belt drives 5 for further advancing without slip the elongate strip. Drive means 5 are generally arranged close to a pin roller 9, to be discussed below. Typically, the distance between the drive means 5 and the pin roller 9 is in the range between about 100 and 300 mm, for example in the range between about 150 and 250 mm or in the range between about 170 and 220 mm. Typically, this distance is measured between the end of drive means 5 and the center point or axis of pin roller 9. Generally, this distance corresponds to the free length of the elongate strip between the pin roller 9 and the drive means 5 along which the elongate strip does not contact the drive means 5 and the pin roller 9. Seen in the direction of advancement of the elongate strip as effected by drive means 5 the liner 6 covering the adhesive layer of the elongate strip 1 is removed behind the drive means 5. The liner 6 is removed and disposed by respective means 31 in a controlled way. The respective means 31 for removing and disposing a liner 6 are optional and their provision depends on whether an elongate strip has a liner.

The specific location of the sensor measurement allows the stress of the elongated strip to be reliably controlled without being influenced by the initial stress which the elongate strip has before reaching the driving means 5 when seen in the direction of advancement of the elongate strip 1.

When an elongate strip 1 comprising a liner 6 is used with the device of the present invention, the measurement of the stress of the elongate strip 1 preferably can take place after the removal of the liner 6, when seen in the direction of travel or advancement of the strip 1.

The device further comprises a guidance unit 7 which is used for guiding the seal prior to application along a defined path.

The device further comprises a stress control unit 8 for controlling the stress of the elongate strip, directly or immediately prior to application, in a controlled and reproducible manner.

The device further comprises a pin roller 9, preferably a driven pin roller 9, which is for positioning, pressing and/or rolling the elongate strip in a controlled way onto the substrate, here the flange 10 of a car body.

For the application procedure, an application head comprising the device according to the present invention is mounted to an axis which is preferably rotatable around 360 degrees. The elongate strip is applied in a circulating manner, its adhesive surface applied upon a designated track on the substrate, here the flange 10 of the aperture of a car body.

According to a particular embodiment, the device further comprises a cutting mechanism 11 located between the pin roller 9 and the drive means 5 for cutting the elongate strip to a defined length thereby allowing or ensuring a gapless joint (start/end) of the strip to be applied on a substrate in a closed contour. Generally, the respective cutting process is controlled by sensors.

According to a particular embodiment in which the device comprises a cutting unit 11, the elongate strip is cut in an angle of about 5° to 25°, for example about 7° to 15° or about 10° towards the normal of the longitudinal axis of the elongate strip. This allows, if the elongate strip is to be applied to a substrate in a closed contour, an improved and more reliable closure of the contour between the end of the first elongate strip and the beginning of the preceding elongate strip.

FIG. 2 shows a schematic view of a device and process according to the present invention. Accordingly, an elongate strip 1 is advanced or driven by drive means 5. As shown in FIG. 2, drive means 5 are constituted by belt drives 5' and 5". Drive means 5 may, according to the present invention, also be constituted by further drive means known in the art, such as drive rollers etc. However, belt drive means and particularly, opposing belt drive means are preferred since such drive means allow a particularly controlled, exact and slipless drive of the elongate strip 1.

Furthermore, FIG. 2 shows the pin roller 9 for positioning, pressing and/or rolling the elongate strip 1 in a controlled way onto a substrate 13. The torque of the pin roller 9 is adjustable and pin roller 9 is preferably driven by a motor M 15. According to a particular embodiment, motor M 15 is used to control the torque as turning moment of the pin roller 9. The provision of a motor M 15 allows the application of the elongate strip to the substrate at a defined stress level e.g., a defined strain or elongation. However, the provision of motor M 15 is one particular embodiment and a pin roller 9 may also work without the provision of motor M 15. In this case, the elongate strip is applied to the substrate in a stress free condition.

As can be seen in FIG. 2, the device according to the present invention comprises a stress control unit 8 for controlling whether the elongate strip is under stress, particular, under tensile or compression stress. The stress control unit 8 comprises a sensor unit 17, arranged and suitable for detecting the stress of the elongate strip in an area between the drive means 5 and the pin roller 9. Generally, the sensor unit 17 is an odometer or a displacement transducer detecting and/or measuring a displacement of the strip which is due to the state of stress in the strip. The sensor unit 17 is, according to an embodiment, a forked lever mechanism as will be discussed later in more detail with regard to FIG. 3.

The sensor unit 17 detects the state of stress of the elongate strip 1, generates a respective signal indicative of the stress of the elongate strip 1 and provides this signal to the control unit 21 of stress control unit 8. The stress control unit may further comprise evaluation or control means 21 which, on the basis of the sensor signal provided by the sensor means 17 generates an input signal to the drive means 5. The speed and/or moment of the drive means 5 is changed in accordance with the input signal received from the stress control unit 17. Thereby, the stress of the elongate strip 1 after the drive means and before the pin roller, seen in feeding direction of the elongate strip 1 as indicated by arrow A and thus, the stress at the moment of application to the substrate can be adjusted.

In an embodiment, the pin roller 9 is a driven pin roller. This particular embodiment is indicated in FIG. 2 as system B wherein the pin roller 9 is driven by motor M 15. The driven pin roller 9 has an adjustable torque due to the provision of motor M 15. If the pin roller 9 is a driven pin roller, stress control unit 8 may further comprise a second sensor unit 19 for detecting information, such as the angular position, of pin roller 9. A respective signal is also provided to the stress control unit 8. Stress control unit 8 provides output instructions to the drive means 5 and/or pin roller 9/motor M 15 based on the signals provided by the sensor units 17 and 19.

According to a particular embodiment, sensor unit 19 determines a value $\epsilon_{PR}$ indicative of the angular position of the pin roller 9 and sensor unit 17 determines a value $A_F$ indicative of the, e.g., dislocation of strip 1, e.g., via a forked lever. The stress control unit 8 now evaluates a signal $\epsilon_{DM}$ indicative of a corresponding angular position of the drive means 5 which is provided to the drive means 5 by the stress control unit. Typically, $\epsilon_{DM}=f(\epsilon_{PR}, A_F)$.

FIG. 3 shows a (top) view on a elongate strip 1 in the area between drive means 5 and pin roller 9 as, e.g., shown in FIG. 2 wherein also a sensor unit 17 in the particular form of a forked lever is shown. FIG. 3a shows a side view of the sensor unit 17 in its form of a forked lever. FIG. 3b shows a top view of the sensor unit 17.

As can be seen in FIG. 3a, elongate strip 1 runs between two side arms of a forked lever comprising a forked lever or U-shaped portion. In a neutral, i.e., stress free status, elongate strip 1 neither touches the left arm 23 nor the right arm 25 (seen in the orientation according to FIG. 3a of forked lever mechanism 17) of the forked portion.

However, as seen in FIGS. 2 and 3b, the neutral path 20 along which elongate strip 1 runs in a stress free situation, is such that, if a tensile or compressive stress is applied to elongate strip 1, elongate strip 1 leaves the neutral path and is dislocated to the right or to the left of its neutral path 20, as indicated by arrows X and Y in FIGS. 2 and 3. As can further be seen in FIG. 3b, according to a particular embodiment, the neutral path 20 of elongate strip 1 is slightly curved in the area between the drive means 5 and pin roller 9. Accordingly, referring to the orientation seen in FIG. 3b, if compressive stress is applied to the elongate strip 1, the curvature increases, i.e., that the radius of the curvature decreases, and the elongate strip moves towards the right as indicated by arrow Y in FIG. 3b. Contrary thereto, if tensile strength is applied to elongate strip 1 in the area after drive means 5 the curvature tends to straighten, i.e., the radius of the curvature enlarges, and the elongate strip 1 moves in direction X, i.e., to the left in FIG. 3, at the location of the sensor unit 17.

As can be seen in the side view shown in FIG. 3a, if elongate strip 1 moves in the direction of arrow X, it will touch the arm 23 of sensor unit 17 thereby dislocating the forked lever means from its neutral position in that it (anti-clock wise) turns around pivot 21 resulting in a dislocation of both the forked position comprising arms 23 and 25 as well as to the opposite portion on the other side of pivot point 21 of sensor unit 17.

Now if the elongate strip 1 moves toward the right, i.e., in direction of the arrow X this would lead to a dislocation of the arm 25 in a corresponding (clock wise) turning of forked lever unit 17 around pivot 21. It is to be noted that form and arrangement of forked lever sensor unit 17 is of exemplary and non-limiting nature only.

The dislocation of a forked lever means, either dislocation of the arms 23, 25 or the dislocation of the opposite end of the forked lever unit is detected and the respective dislocation $A_F$ is provided to the stress control unit 8.

As will be readily understood by the person skilled in the art, the sensor unit may also be of different forms and techniques than the lever or forked lever mechanism discussed above. In particular, according to further embodiments, a dislocation of the elongate strip 1 may further be determined by means of contact or contactless sensor unit such as, e.g., optical methods and devices.

FIG. 4 shows a device according to the present invention used with a mounting head 33 for applying elongate strips such as seals or weatherstrips 1 to car bodies 3, when the device is mounted on a robot 27 having several degrees of freedom of movement, e.g., $Z_1$ to $Z_3$. This allows the device according to the present invention to be used in numerous ways in different specific applications and even using different elongate strips.

According to particular embodiments of the present invention, the method of the present invention is a static, dynamic or hybrid method, i.e., the application device is moving while the substrate stands still (dynamic), the device stands still while the substrate is moving (static) or both device and substrate are moving (hybrid). The device according to the present invention is typically suitable to be used in static, dynamic and hybrid methods.

The device and method according to the present invention generally allows a continuous and fast reacting control of the stress of the elongate strip immediately before application to a substrate.

The invention claimed is:

1. A device for applying an elongate strip to a rigid substrate, the device comprising:
    drive apparatus configured to advance the elongate strip;
    an application unit configured to at least one of position, press and roll the elongate strip along a portion of the rigid substrate;
    a stress control unit configured to control stress of the elongate strip, wherein the stress control unit comprises at least one sensor unit configured to measure, in an area between the drive apparatus and the application unit, a stress level of the elongate strip; and
    a control unit configured to control the drive apparatus based on the stress level of the elongate strip as measured by the at least one sensor unit, wherein the application unit is driven so that torque of the application unit is adjustable.

2. The device according to claim 1, wherein the drive apparatus comprises a belt drive.

3. The device according to claim 1, wherein the drive apparatus comprises two drive mechanisms arranged on opposite sides of the elongate strip.

4. The device according to claim 1, wherein the application unit comprises a pin roller.

5. The device according to claim 1, wherein the application unit comprises a driven application unit driven by a motor so that the driven application unit has an adjustable torque.

6. The device according to claim 1, wherein the application unit furnishes a defined stress in the elongate strip.

7. The device according to claim 1, wherein the stress control unit further measures a parameter of the application unit and advancement of the elongate strip is controlled also based on the measured parameter of the application unit.

8. The device according to claim 1, wherein the sensor unit comprises a displacement transducer sensing a displacement of the elongate strip due to its stress level.

9. The device according to claim 1, wherein the device comprises an additional sensor to detect an angular position of the application unit.

10. The device according to claim 1, wherein, between the drive apparatus and the application unit, the elongate strip performs an incremental loop such that a displacement of the elongate strip due to its stress level is increased compared to a situation where the elongate strip is without a loop.

11. The device according to claim 1, wherein the sensor unit comprises at least one of a lever mechanism and a forked lever mechanism.

12. A method for applying a strip to a rigid substrate, the method comprising:
advancing an elongate strip using a drive apparatus;
using an application unit to apply, by at least one of positioning, pressing and rolling, the elongate strip along a portion of the rigid substrate;
measuring the stress level of the elongate strip in an area between the drive apparatus and the application unit; and
controlling advancement of the elongate strip based on the stress level of the elongate strip as measured, wherein the application unit is driven so that torque of the application unit is adjustable.

13. The method according to claim 12, wherein the method further comprises:
measuring a parameter of the application unit; and
controlling advancement of the elongate strip also based on the measured parameter of the application unit.

14. A device for applying an elongate strip to a substrate, comprising:
a drive apparatus to advance the elongate strip;
an application unit to apply the elongate strip on a substrate;
at least one sensor unit to measure, in the area between the drive apparatus and the application unit directly or immediately prior to the application of the elongate strip on the substrate, a stress level of the elongate strip; and
a control unit to control the drive apparatus based on the stress level of the elongate strip as measured by the at least one sensor unit, wherein the application unit is driven so that the torque of the application unit is adjustable.

15. The device according to claim 14, wherein the drive apparatus comprises at least one belt drive.

16. The device according to claim 14, wherein the application unit comprises a pin roller.

17. The device according to claim 14, wherein the control unit receives a measurement representative of a parameter ($\epsilon_{PR}$) of the application unit and controls the drive apparatus based on the stress level of the elongate strip and also based on the parameter ($\epsilon_{PR}$).

18. The device according to claim 14, wherein the at least one sensor unit comprises a displacement transducer sensing a displacement of the elongate strip due to its stress level.

19. The device according to claim 14, wherein the at least one sensor unit comprises a sensor for detecting a rotational angular position of the application unit.

20. The device according to claim 14, wherein the sensor unit comprises a forked lever mechanism.

21. The device according to claim 1, wherein the elongate strip comprises an elongate elastomeric seal strip, wherein the elongate elastomeric seal strip comprises an adhesive layer, wherein a removable liner covers the adhesive layer of the elongate elastomeric seal strip, wherein the device further comprises a liner removal apparatus, and further wherein the at least one sensor unit is configured to measure, in an area between the drive apparatus and the application unit, a stress level of the elongate elastomeric seal strip after the removable liner is removed from the elongate elastomeric seal strip using the liner removal apparatus.

22. The method according to claim 12, wherein the elongate strip comprises an elongate elastomeric seal strip, wherein the elongate elastomeric seal strip comprises an adhesive layer, wherein a removable liner covers the adhesive layer of the elongate elastomeric seal strip, wherein the method further comprises removing the removable liner from the elongate elastomeric seal strip, and further wherein measuring the stress level of the elongate elastomeric seal strip comprises measuring the stress level of the elongate elastomeric seal strip after the removable liner is removed from the elongate elastomeric seal strip.

23. The method according to claim 13, wherein the measured parameter of the application unit is representative of at least one of rotary angle and turning moment.

24. The device according to claim 1, wherein the rigid substrate comprises at least one of a vehicle body and an appliance body.

25. The method according to claim 12, wherein the rigid substrate comprises at least one of a vehicle body and an appliance body.

26. The device according to claim 1, wherein the elongate strip comprises an elongate elastomeric seal strip, wherein the elongate elastomeric seal strip comprises an adhesive layer, and further wherein the application unit is configured to at least one of position, press and roll the elongate elastomeric seal strip along a portion of the rigid substrate for use in providing a seal about an opening.

27. The method according to claim 12, wherein the elongate strip comprises an elongate elastomeric seal strip, wherein the elongate elastomeric seal strip comprises an adhesive layer, wherein advancing the elongate strip using a drive apparatus comprises advancing the elongate elastomeric seal strip using a drive apparatus, and further wherein using the application unit to apply the elongate strip comprises using an application unit to apply, by at least one of positioning, pressing and rolling, the elongate elastomeric seal strip along a portion of the rigid substrate for use in providing a seal about an opening.

* * * * *

UNITED STATES PATENT AND TRADEMARK OFFICE
CERTIFICATE OF CORRECTION

PATENT NO.      : 8,475,611 B2                                                          Page 1 of 1
APPLICATION NO. : 12/442656
DATED           : July 2, 2013
INVENTOR(S)     : Malecki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 735 days.

Signed and Sealed this
Eighth Day of September, 2015

Michelle K. Lee
*Director of the United States Patent and Trademark Office*